US012174320B2

(12) United States Patent
Golikov et al.

(10) Patent No.: US 12,174,320 B2
(45) Date of Patent: Dec. 24, 2024

(54) LiDAR METHODS AND SYSTEMS WITH BROADENED FIELD OF VIEW BASED ON PASSIVE ELEMENTS

(71) Applicant: YANDEX SELF DRIVING GROUP LLC, Moscow (RU)

(72) Inventors: Andrey Victorovich Golikov, Zelenograd (RU); Nikolay Evgenievich Orlov, Udmurtskaya Resp (RU); Dmitry Valentinovich Solomentsev, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1056 days.

(21) Appl. No.: 17/110,555

(22) Filed: Dec. 3, 2020

(65) Prior Publication Data
US 2021/0190920 A1    Jun. 24, 2021

(30) Foreign Application Priority Data
Dec. 23, 2019    (RU) ............................ RU2019143318

(51) Int. Cl.
*G01S 7/481*    (2006.01)
*G01S 17/10*    (2020.01)
(Continued)

(52) U.S. Cl.
CPC ............ *G01S 7/4817* (2013.01); *G01S 17/10* (2013.01); *G01S 17/89* (2013.01); *G01S 17/931* (2020.01)

(58) Field of Classification Search
CPC ...... G01S 7/4817; G01S 17/89; G01S 17/931; G01S 17/10; G01S 7/4813; G01S 7/4818;
(Continued)

(56) References Cited

U.S. PATENT DOCUMENTS 4,687,325 A * 8/1987 Corby, Jr. ............. G01B 11/25
356/3.09
6,830,184 B2   12/2004 Tsikos et al.
(Continued)

FOREIGN PATENT DOCUMENTS

DE    102017104104 A1    8/2018
DE    102017119038 A1    2/2019
(Continued)

OTHER PUBLICATIONS

European Search Report dated Feb. 27, 2023 issued in respect of the European Patent Application No. 20184662.3.
(Continued)

*Primary Examiner* — Daniel L Murphy
(74) *Attorney, Agent, or Firm* — BCF LLP

(57) ABSTRACT

LiDAR systems and methods for detecting objects in a region of interest, the system comprising: a radiation source for emitting an output beam; an oscillating component having a oscillating component reflective surface for receiving the output beam, the oscillating component arranged to oscillate to modulate the output beam to a first spread beam having a first spread beam interval along a first spread axis; at least two static optical components having respective optical component reflective surfaces for receiving the first spread beam, the respective optical component reflective surfaces being angularly offset from one another such that: each one of the respective optical component reflective surfaces receives and reflects a respective portion of the first spread beam; the reflected respective portions together comprise a second spread beam having a second spread beam interval along a second spread axis which is larger than the first spread beam interval.

21 Claims, 7 Drawing Sheets

(51) Int. Cl.
*G01S 17/89* (2020.01)
*G01S 17/931* (2020.01)

(58) Field of Classification Search
CPC ...... G01S 13/865; G01S 13/931; G01S 7/481;
G01S 17/02; G02B 26/101
USPC ........................................................ 356/5.01
See application file for complete search history.

(56) References Cited

U.S. PATENT DOCUMENTS

| | | |
|---|---|---|
| 10,324,170 B1 | 6/2019 | Engberg et al. |
| 2012/0236379 A1 | 9/2012 | Da Silva et al. |
| 2012/0249996 A1 | 10/2012 | Tanaka et al. |
| 2014/0132600 A1 | 5/2014 | Shimoyama et al. |
| 2018/0231640 A1 | 8/2018 | Han et al. |
| 2019/0041524 A1 | 2/2019 | Korsgaard et al. |

FOREIGN PATENT DOCUMENTS

| | | |
|---|---|---|
| EP | 2221638 A1 | 8/2010 |
| RU | 2292566 C1 | 1/2007 |
| WO | 18206251 A | 11/2018 |
| WO | 2018197246 A1 | 11/2018 |

OTHER PUBLICATIONS

European Search Report issued in corresponding European patent application No. 2018466.2 on Dec. 10, 2020.
Search Report issued in corresponding Russian patent application No. 2019143318 on Feb. 19, 2021.
Wang et al., "An Integrated Forward-View 2-Axis Mems Scanner for Compact 3D LIDAR", Conference: 2018 IEEE 13th Annual International Conference on Nano/Micro Engineered and Molecular Systems (NEMS), http://focus.ece.ufl.edu/wp-content/uploads/IEEE-NEMS-2018.pdf, 4 pages.
English Abstract for DE102017119038 retrieved on Espacenet on Dec. 2, 2020.

* cited by examiner

LiDAR METHODS AND SYSTEMS WITH BROADENED FIELD OF VIEW BASED ON PASSIVE ELEMENTS

CROSS-REFERENCE

The present application claims priority to Russian Patent Application No. 2019143318, entitled "LiDAR METHODS AND SYSTEMS WITH BROADENED FIELD OF VIEW BASED ON PASSIVE ELEMENTS," filed on Dec. 23, 2019, the entirety of which is incorporated herein by reference.

FIELD OF TECHNOLOGY

The present technology relates to Light Detection and Ranging (LiDAR) systems, and more specifically, to LiDAR systems for detecting objects in a region of interest.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect an object located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

Other technical challenges with the implementation of the above systems include de-calibration of sensors and other components that gather data about the surroundings of the vehicle. A plethora of factors, including weather, road conditions, driving habits, for example, influence sensors and other components over time, requiring calibration in order to ensure that data is accurately captured and correctly used for controlling vehicles.

In LiDAR-based systems, objects around the vehicle can be detected by transmitting beams of light towards a region of interest, and measuring reflected light beams with a detector. Lasers emitting pulses of light within a narrow wavelength are often used as the light source. The position and distance of the object can be computed using Time of Flight calculations of the emitted and detected light beam. By computing such positions as "data points", a digital multi-dimensional representation of the surroundings can be generated.

In rotational LiDAR-based systems, the light beams are caused to rotate about a horizontal or vertical axis which can provide a scan of the region of interest in the horizontal or vertical plane, respectively. Typically, such rotation of the beams is achieved by a laser which is rotatable. However, moving components of the LiDAR system are prone to wear and tear leading to premature failure of the system.

Moreover, in certain conventional systems, a spread of the region of interest is limited by rotation of the light beams about a horizontal and/or vertical axis. In order to scan a larger region of interest, a more complicated rotation mechanism is required.

SUMMARY

Therefore, there is a need for systems which avoid, reduce or overcome the limitations of the prior art.

Oscillating components along with static optical components have been proposed for LiDAR systems. In such systems, scanning on a vertical axis and/or horizontal axis is available and determined by an amplitude of oscillation of the oscillating component and an increased scanning interval associated with the region of interest with the help of less expensive static optical components.

Developers of the present technology have identified drawbacks of prior art solutions.

For example, US 20180231640 A1, published on Aug. 16, 2018 and currently assigned to Baidu USA LLC, describes a light detection and range (LIDAR) device includes a light source to emit a light beam to scan a range of orientations associated with a target scanning zone. The LIDAR device further includes a first microelectromechanical system (MEMS) mirror configured to receive and redirect the light beam towards to the target scanning zone. The first MEMs mirror is configured to tilt vertically and horizontally to redirect the light beam in a plurality of angles. The LIDAR device further includes a light detector to receive the light beam reflected from one or more objects located within the target scanning zone. The first MEMS mirror tilts multiple directions with respect to the light source to allow the light source to emit the light beam and the light detector to receive the reflected light beam to obtain multiple angular resolutions of the one or more objects.

U.S. Ser. No. 10/324,170 B1, published on May 18, 2019 and currently assigned to Luminar Technologies Inc, describes a lidar system including a light source configured to produce first and second beams of light, receivers to configured to detect light from the first and second beams of light and scattered by one or more remote targets, and a scanner including a first scan mirror configured to pivot along a first-mirror pivot axis to scan the first beam of light along a first direction, a second scan mirror configured to pivot along a second-mirror pivot axis to scan the second beam of light along the first direction, and a polygon with multiple reflective surfaces configured to rotate about a polygon-mirror rotation axis to scan the first and second beams of light along a second direction.

Developers have identified that in providing systems which can scan over a broader region of interest, consideration must also be given to improving one or more of a speed of scanning the region of interest which cannot be prohibitively slow, especially if the LiDAR system is associated with a moving vehicle; the ability to detect the reflected light over a broader area; cost considerations; and expected lifetime of such LiDAR systems.

Broadly, inventors have developed a LiDAR system that can scan an increased area compared to conventional systems without the use of additional light sources or moving components, in certain embodiments. In certain embodiments, LiDAR systems of the present technology have an increased angle of spread of the beam of light transmitted to the region of interest, on one or both of the horizontal or vertical axis.

In certain embodiments, advantages of the present technology include an increased density of data points in a given region of interest (ROI), and hence an increased resolution of the object in the ROI. Also, the present technology includes an increased capacity of the system without compromising an expense and complexity of the system.

In accordance with a first broad aspect of the present technology, there is provided a LiDAR system for detecting objects in a region of interest, the system comprising a radiation source for emitting an output beam, an oscillating having an oscillating component reflective surface for receiving the output beam, the oscillating component being arranged to oscillate to modulate the output beam to a first spread beam having a first spread beam interval along a first spread axis, at least two static optical components having respective optical component reflective surfaces for receiving the first spread beam, the respective optical component reflective surfaces of the at least two static optical components being angularly offset from one another such that each one of the respective optical component reflective surfaces receives and reflects a respective portion of the first spread beam, the reflected respective portions of the first spread beam together comprise a second spread beam having a second spread beam interval along a second spread axis, the second spread beam interval being larger than the first spread beam interval.

In some embodiments, the LiDAR system, wherein the respective optical component reflective surfaces of the at least two static optical components are angularly offset from one another by an offset angle on one or two planes.

In some embodiments, the LiDAR system, wherein The LiDAR system of claim 2, wherein the offset angle is one plane and is less than 180°.

In some embodiments, the LiDAR system, wherein the oscillating component and the at least two optical components are positioned relative to each other such that substantially all of the first spread beam is incident on the respective optical component reflective surfaces of the at least two optical components.

In some embodiments, the LiDAR system, wherein the at least two static optical components comprise two static optical components having a first static optical component having a first optical component reflective surface for receiving a first portion of the first spread beam and reflecting the first portion of the first spread beam as a first portion of the second spread beam, and a second static optical component having a second optical component reflective surface for receiving a second portion of the first spread beam and reflecting the second portion of the first spread beam as a second portion of the second spread beam, the first and the second portions of the second spread beam comprising the spread beam having the second spread beam interval along the second spread axis.

In some embodiments, the LiDAR system, wherein the first portion of the second spread beam has an optical axis which is different than an optical axis of the second portion of the second spread beam.

In some embodiments, the LiDAR system, wherein the first portion of the first spread beam is about 50% of the first spread beam.

In some embodiments, the LiDAR system, wherein the output beam comprises a single beam emitted by the radiation source and which is undivided when received on the oscillating component reflective surface of the oscillating component.

In some embodiments, the LiDAR system, wherein the system is arranged such that the second spread beam is a final beam transmitted directly to the region of interest.

In some embodiments, the LiDAR system, wherein the second spread beam interval is up to 100% more than the first spread beam interval.

In some embodiments, the LiDAR system, wherein the at least two optical components are passive mirrors.

In some embodiments, the LiDAR system, wherein the at least two optical components are prisms.

In some embodiments, the LiDAR system, wherein an orientation of the first spread axis and the second spread axis comprise one or more of the first spread axis is horizontal and the second spread axis horizontal, the first spread axis is horizontal and the second spread axis is vertical, the first spread axis is vertical and the second spread axis horizontal, the first spread axis is vertical and the second spread axis is vertical.

In some embodiments, the LiDAR system, wherein the first spread beam interval is associated with an amplitude of oscillation of the oscillating component.

In some embodiments, the LiDAR system, further comprising a detector for detecting an input beam from the region of interest, and a return pathway for the input beam from the region of interest to the detector.

In some embodiments, the LiDAR system, wherein the return pathway comprises a path from the region of interest to the at least two static optical components and the oscillating component to the detector.

In some embodiments, the LiDAR system, wherein the return pathway includes a sub-portion that is a same path as one used for the first spread beam.

In some embodiments, the LiDAR system, wherein the return pathway includes a sub-portion that is a different path as one used for the first spread beam.

In some embodiments, the LiDAR system, wherein the at least two static optical components are spatially offset.

In some embodiments, the LiDAR system, wherein the oscillating component is a microelectromechanical (MEMS) component.

In some embodiments, the LiDAR system, wherein the oscillating component is a galvo-scanner component.

In accordance with a second broad aspect of the present technology, there is provided a method for detecting objects in a region of interest, the method implemented by a processor communicatively connected to a LiDAR system, the method comprising causing a radiation source to emit an output beam towards an oscillating component, causing the oscillating component to reflect the output beam, as a first spread beam having a first spread beam interval along a first spread axis, towards at least two static optical components having respective optical component reflective surfaces, wherein the respective optical component reflective surfaces are angularly offset from one another, the at least two static optical components configured to reflect a respective portion of the first spread beam such that the reflected respective portions of the first spread beam correspond to a second spread beam having a second spread beam interval along a second spread axis, the second spread beam interval being larger than the first spread beam interval.

In the context of the present specification, a "radiation source" broadly refers to any device configured to emit radiation such as a radiation signal in the form of a beam. A radiation source includes, but is not limited to a light source configured to emit light beams. The light source may be a laser such as a solid-state laser, laser diode, a high power laser, or an alternative light source such as, a light emitting diode (LED)-based light source. Some (non-limiting) examples of the light source are Fabry-Perot laser diode, a quantum well laser, a distributed Bragg reflector (DBR) laser, a distributed feedback (DFB) laser, or a vertical-cavity surface-emitting laser (VCSEL). In addition, light source may emit light beams in differing formats, such as light pulses, continuous wave (CW), quasi-CW, and so on. In some non-limiting examples, the light source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm or in between any other suitable range. Unless indicated otherwise, the term "about" with regard to a numeric value is defined as a variance of up to 10% with respect to the stated value.

In the context of the present specification, an "output beam" may also be referred to a radiation beam, such as a light beam, that is generated by the radiation source and is directed downrange towards a region of interest (ROI). The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" may also be referred to as a radiation beam, such as a light beam, reflected from one or more objects in the ROI. By reflected is meant that at least a portion of the light beam from the output beam bounces off the one or more objects in the ROI. The output beam may have one or more parameters such as: time-of-flight (i.e., time from emission until detection), instantaneous power (e.g., power signature), average power across entire return pulse, and photon distribution/signal over return pulse period etc.

In the context of the present specification, a "Region of Interest" may broadly include a portion of the observable environment of LiDAR system in which the one or more objects may be detected. It is noted that the region of interest (ROI) of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
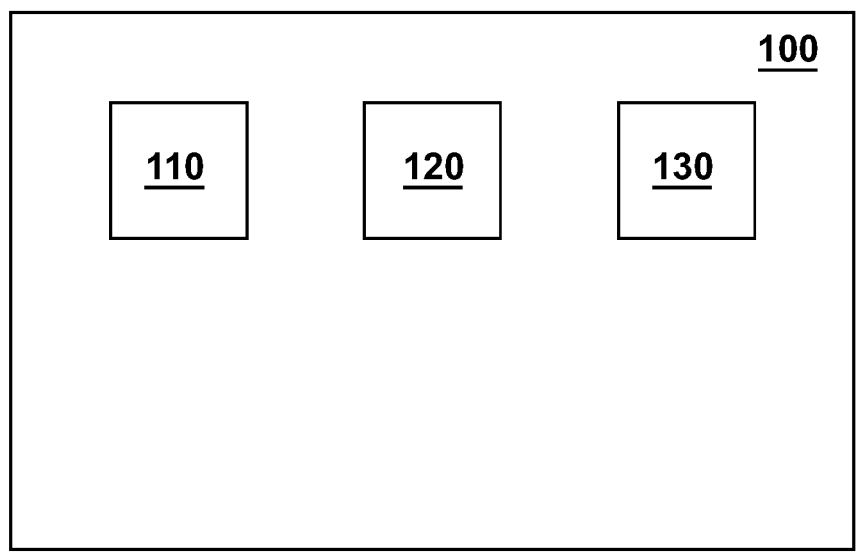
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
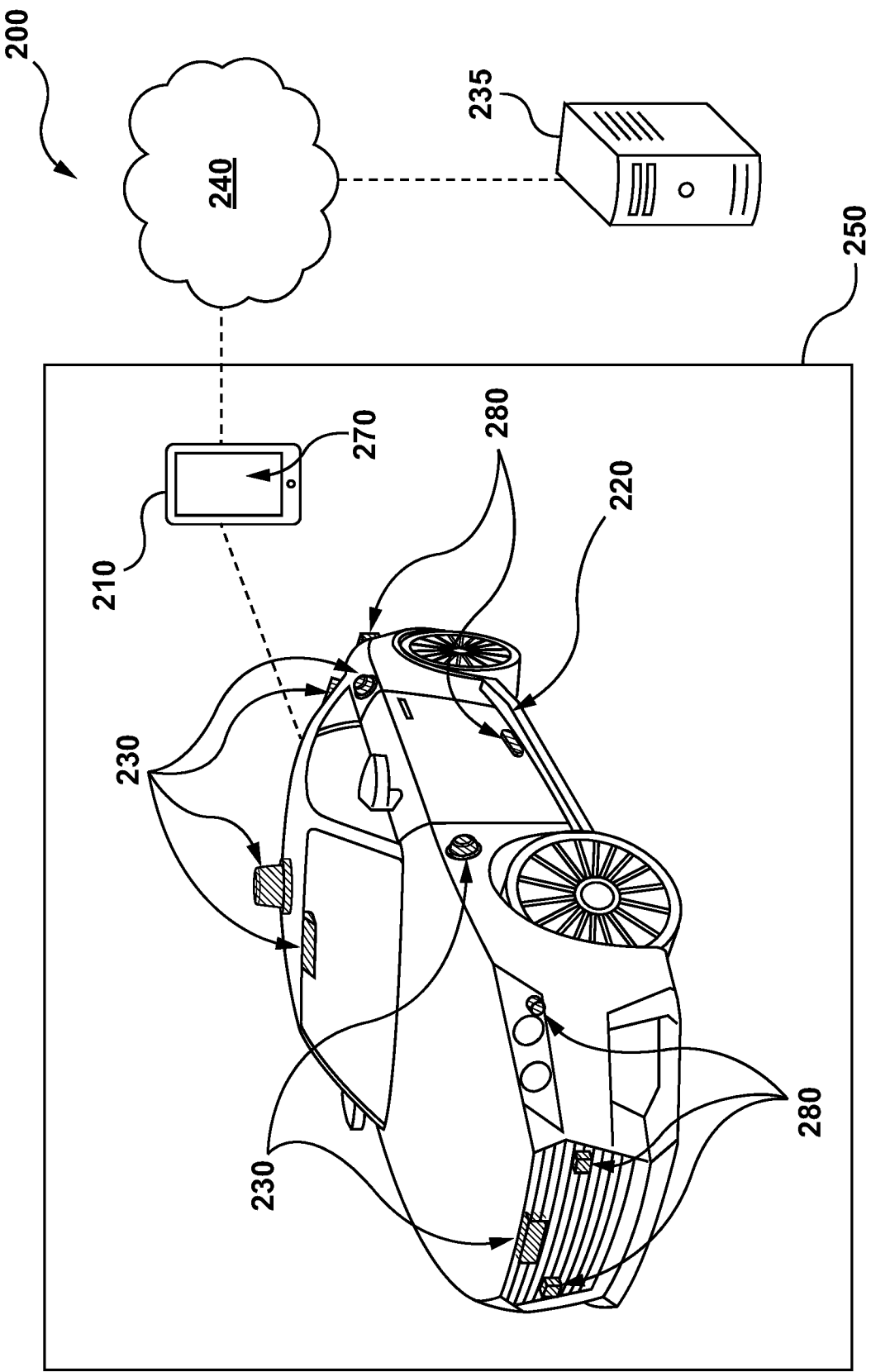
FIG. 2 depicts a networked computing environment being suitable for use with certain embodiments of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who is associated with the vehicle 220, such as an operator of the vehicle 220, a server 235 in communication with the electronic device 210 via a communication network 240 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any transportation vehicle, for leisure or otherwise, such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Car (SDC). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for processing data as will be described in greater detail below.

In some embodiments of the present technology, the communication network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 240 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 235.

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

It should be noted that a variety of sensors and systems may be used by the electronic device 210 for gathering information about the surroundings of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may comprise one or more camera-type sensor systems that are mounted to the vehicle 220 and communicatively coupled to the processor 110. Broadly speaking, the one or more camera-type sensor systems may be configured to gather image data about various portions of the surroundings 250 of the vehicle 220. In some cases, the image data provided by the one or more camera-type sensor systems may be used by the electronic device 210 for performing object detection procedures. For example, the electronic device 210 may be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 may comprise one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220 and which data may be representative of distance of objects from the radar-type sensor system, orientation of objects, velocity and/or speed of objects, and the like.

It should be noted that the plurality of sensor systems 280 may comprise additional types of sensor systems to those non-exhaustively described above and without departing from the scope of the present technology.

Furthermore, the vehicle 220 is equipped with one or more Light Detection and Ranging (LiDAR) systems 230 for gathering information about surroundings 250 of the vehicle 220. The LiDAR system 230 may be in addition to, or in some cases instead of, the plurality of sensor systems 280. A given LiDAR system 230 from the one or more LiDAR systems 230 may be mounted (or retrofitted) to the vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting the given LiDAR system 230 are within the scope of the present disclosure, including on a back window, side windows, front hood, rooftop, front grill, front bumper or the side of the vehicle 220. In some cases, the given LiDAR system 230 can even be mounted in a dedicated enclosure mounted on the top of the vehicle 220.

As mentioned above, the one or more LiDAR systems 230 may also be mounted in a variety of configurations.

In one embodiment, the given LiDAR system 230 of the one or more LiDAR systems 230 that is illustrated in FIG. 2 as being mounted to the rooftop of the vehicle 220 may be so-mounted in a rotatable configuration. For example, the given LiDAR system 230 mounted to the vehicle 220 in a rotatable configuration may comprise at least some components that are rotatable 360 degrees about an axis of rotation of the given LiDAR system 230. It should be noted that the given LiDAR system 230 mounted in rotatable configurations may gather data about most of the portions of the surroundings 250 of the vehicle 220.

In another embodiment, the given LiDAR system 230 of the one or more LiDAR systems 230 that is mounted to the side (or the front grill, for example) of the vehicle 220 may be so-mounted in a non-rotatable configuration. For example, the given LiDAR system 230 mounted to the vehicle 220 in a non-rotatable configuration may comprise at least some components that are not rotatable 360 degrees and are configured to gather data about pre-determined portions of the surroundings 250 of the vehicle 220.

Irrespective of the specific location and/or the specific configuration, the given LiDAR system 230 is configured to capture data about the surroundings 250 of the vehicle 220 for building a multi-dimensional map of objects in the surroundings 250 of the vehicle 220. How the given one or more LiDAR systems 230 are configured to capture data about the surroundings 250 of the vehicle 220 will now be described.

LiDAR System

Figure 3:
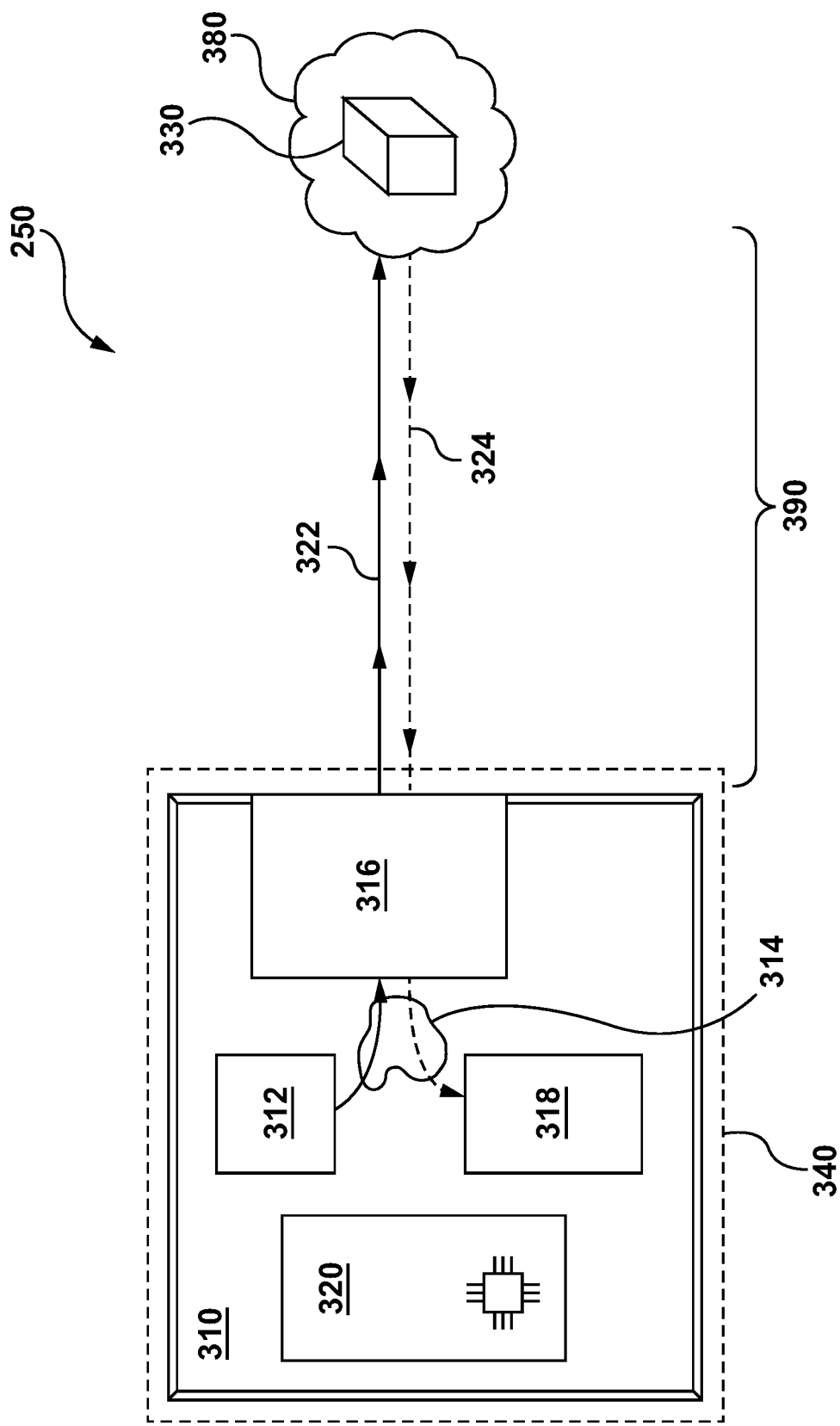
FIG. 3 depicts a schematic diagram of an example LiDAR system for implementing certain embodiments of systems and/or methods of the present technology.

With reference to FIG. 3, there is depicted a non-limiting example of a LiDAR system 310. It should be noted that the one or more LiDAR systems 230 (see FIG. 2) may be implemented in a similar manner to the implementation of the LiDAR system 310.

Broadly speaking, the LiDAR system 310 may comprise a variety of internal components such as, but not limited to: (i) a radiation source component 312, such as a light source component, (ii) a scanner component 316, (iii) a receiver component 318 (also referred to herein as detection system), and (iv) a controller component 320. It is contemplated that in addition to the internal components non-exhaustively listed above, the LiDAR system 310 may further comprise a variety of sensors (such as, for example, a temperature sensor, a moisture sensor, etc.) which are omitted from FIG. 3 for sake of clarity.

It is contemplated that, in some cases, one or more of internal components of the LiDAR system 310 may be implemented in a common housing 340 as depicted in FIG. 3. In other implementations, at least the controller component 320 may be located remotely from the common housing 340.

Radiation Source Component

The radiation source component 312 is communicatively coupled to the controller component 320 and is configured to emit radiation, such as a radiation signal in the form of a beam. In certain embodiments, the radiation source component 312 is configured to emit light, and is referred to herein as a light source component 312. The light source component 312 comprises one or more lasers that emit light having a particular operating wavelength. The operating wavelength of the light source component 312 may be in the infrared, visible, and/or ultraviolet portions of the electromagnetic spectrum. For example, the light source component 312 may include one or more lasers with an operating wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. However, it should be noted that the light source component 312 may include lasers with different operating wavelengths, without departing from the scope of the present technology. In certain other embodiments, the light source component 312 comprises a light emitting diode (LED).

In operation, the light source component 312 generates an output beam 322 of light. It is contemplated that the output beam 322 may have any suitable form such as continuous-wave, or pulsed. As illustrated in FIG. 3, the output beam 322 exits the LiDAR system 310 and is directed downrange towards the surroundings 250.

Let it be assumed that an object 330 is located at a distance 390 from the LiDAR system 310. It should be noted though, as will be explained below in greater detail, the presence of the object 330 and the distance 390 are not apriori known and that the purpose of the LiDAR system 310 is to locate the object 330 and/or capture data for building a multi-dimensional map of at least a portion of the surroundings 250 with the object 330 (and other potential objects) being represented in it in a form of one or more data points.

Once the output beam 322 reaches the object 330, the object 330 may reflect at least a portion of light from the output beam 322, and some of the reflected light beams may return back towards the LiDAR system 310. By reflected is meant that at least a portion of light beam from the output beam 322 bounces off the object 330. A portion of the light beam from the output beam 322 may be absorbed by the object 330.

In the example illustrated in FIG. 3, the reflected light beam is represented by input beam 324. The input beam 324 is captured by the LiDAR system 310 via the receiver component 318. It should be noted that, in some cases, the input beam 324 may contain only a relatively small fraction of the light from the output beam 322. It should also be noted that an angle of the input beam 324 relative to a surface of the object 330 ("angle of incidence") may be the same or different than an angle of the output beam 322 relative to surface of the object 330 ("angle of reflection").

It should also be noted that the operating wavelength of the LiDAR system 310 may lie within portions of the electromagnetic spectrum that correspond to light produced by the sun. Therefore, in some cases, sunlight may act as background noise which can obscure the light signal detected by the LiDAR system 310. This solar background noise can result in false-positive detections and/or may otherwise corrupt measurements of the LiDAR system 310. Although it may be feasible to increase a Signal-to-Noise Ratio (SNR) of the LiDAR system 310 by increasing the power level of the output beam 322, this may not be desirable in at least some situations. For example, increasing power levels of the output beam 322 may result in the LiDAR system 310 not being eye-safe.

It is contemplated that the LiDAR system 310 may comprise an eye-safe laser, or put another way, the LiDAR system 310 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

As previously alluded to, the light source component 312 may include one or more pulsed lasers configured to produce, emit, or radiate pulses of light with certain pulse duration. For example, the light source component 312 may be configured to emit pulses with a pulse duration (e.g., pulse width) ranging from 10 ps to 100 ns. In another example, the light source component 312 may emit pulses at a pulse repetition frequency of approximately 100 kHz to 5 MHz or a pulse period (e.g., a time between consecutive pulses) of approximately 200 ns to 10 μs. Overall, however, the light source component 312 can generate the output beam 322 with any suitable average optical power, and the output beam 322 may include optical pulses with any suitable pulse energy or peak optical power for a given application.

In some embodiments, the light source component 312 may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source component 312 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source component 312 may include one or more laser diodes that are current-modulated to produce optical pulses. In some embodiments, the light source component 312 may be a fiber-laser source.

In some embodiments, the output beam 322 emitted by the light source component 312 is a collimated optical beam with any suitable beam divergence for a given application. Broadly speaking, divergence of the output beam 322 is an angular measure of an increase in beam size (e.g., a beam radius or beam diameter) as the output beam 322 travels away from the light source component 312 or the LiDAR system 310. In some embodiments, the output beam 322 may have a substantially circular cross section.

It is also contemplated that the output beam 322 emitted by light source component 312 may be unpolarized or randomly polarized, may have no specific or fixed polarization (e.g., the polarization may vary with time), or may have a particular polarization (e.g., the output beam 322 may be linearly polarized, elliptically polarized, or circularly polarized).

In at least some embodiments, the output beam 322 and the input beam 324 may be substantially coaxial. In other words, the output beam 322 and input beam 324 may at least partially overlap or share a common propagation axis, so that the input beam 324 and the output beam 322 travel along substantially the same optical path (albeit in opposite directions). Nevertheless, in other embodiments, it is contemplated that the output beam 322 and the input beam 324 may not be coaxial, or in other words, may not overlap or share a common propagation axis inside the LiDAR system 310, without departing from the scope of the present technology.

It should be noted that in at least some embodiments of the present technology, the light source component 312 may be rotatable, such as by 360 degrees or less, about the axis of rotation (not depicted) of the LiDAR system 310 when the LiDAR system 310 is implemented in a rotatable configuration. However, in other embodiments, the light source component 312 may be stationary even when the LiDAR system 310 is implemented in a rotatable configuration, without departing from the scope of the present technology.

Internal Beam Paths

As schematically illustrated in FIG. 3, the LiDAR system 310 may make use of a given internal beam path from a plurality of internal beam paths 314 for emitting the output beam 322 (generated by the light source component 312) towards the surroundings 250. In one example, the given internal beam path amongst the plurality of internal beam paths 314 may allow providing the light from the light source component 312 to the scanner component 316 and, in turn, the scanner component 316 may allow the output beam 322 to be directed downrange towards the surroundings 250.

Also, the LiDAR system 310 may make use of another given internal beam path from the plurality of internal beam paths 314 for providing the input beam 324 to the receiver component 318. In one example, the another given internal beam path amongst the plurality of internal beam paths 314 may allow providing the input beam 324 from the scanner component 316 to the receiver component 318. In another example, the another given internal beam path amongst the plurality of internal beam paths 314 may allow providing the input beam 324 directly from the surroundings 250 to the receiver component 318 (without the input beam 324 passing through the scanner component 316).

It should be noted that the plurality of internal beam paths 314 may comprise a variety of optical components. For example, the LiDAR system 310 may include one or more optical components configured to condition, shape, filter, modify, steer, or direct the output beam 322 and/or the input beam 324. For example, the LiDAR system 310 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEMS) components, collimating elements, or holographic elements.

It is contemplated that in at least some embodiments, the given internal beam path and the another internal beam path from the plurality of internal beam paths 314 may share at least some common optical components, however, this might not be the case in each and every embodiment of the present technology.

Scanner Component

Generally speaking, the scanner component 316 steers the output beam 322 in one or more directions downrange towards the surroundings 250. The scanner component 316 may comprise a variety of optical components and/or mechanical-type components for performing the scanning of the output beam 322. For example, the scanner component 316 may include one or more mirrors, prisms, lenses, oscillating components, galvo-scanners piezoelectric components, optical fibers, splitters, diffractive elements, collimating elements, and the like. It should be noted the scanner component 316 may also include one or more actuators (not illustrated) driving at least some optical components to rotate, tilt, pivot, or move in an angular manner about one or more axes, for example.

The scanner component 316 may be configured to scan the output beam 322 over a variety of horizontal angular ranges and/or vertical angular ranges. In other words, the scanner component 316 may be instrumental in providing the LiDAR system 310 with a desired Region of Interest (ROI) 380. The ROI 380 of the LiDAR system 310 may refer to an area, a volume, a region, an angular range, and/or portion(s) of the surroundings 250 about which the LiDAR system 310 may be configured to scan and/or can capture data.

It should be noted that the scanner component 316 may be configured to scan the output beam 322 horizontally and/or vertically, and as such, the ROI 380 of the LiDAR system 310 may have a horizontal direction and a vertical direction. For example, the LiDAR system 310 may have a horizontal ROI of 360 degrees and a vertical ROI of 45 degrees.

The scanner component 316 may be communicatively coupled to the controller component 320. As such, the controller component 320 may be configured to control the scanner component 316 so as to guide the output beam 322 in a desired direction downrange and/or along a desired scan pattern. Broadly speaking, a scan pattern may refer to a pattern or path along which the output beam 322 is directed by the scanner component 316 during operation.

The LiDAR system 310 may thus make use of the scan pattern to generate a point cloud substantially covering the ROI 380 of the LiDAR system 310. As will be described in greater detail herein further below, this point cloud of the LiDAR system 310 may be used to render a multi-dimensional map of objects in the surroundings 250 of the vehicle 220.

In operation, in certain embodiments, the light source component 312 emits pulses of light (represented by the output beam 322) which the scanner component 316 scans across the ROI 380 of the LiDAR system 310 in accordance with the scan pattern. As mentioned above, the object 330 may reflect one or more of the emitted pulses. The receiver component 318 receives or detects photons from the input beam 324 and generates one or more representative data signals. For example, the receiver component 318 may generate an output electrical signal (not depicted) that is representative of the input beam 324. The receiver component 318 may also provide the so-generated electrical signal to the controller component 320 for further processing.

Receiver Component

The receiver component 318 is communicatively coupled to the controller component 320 and may be implemented in a variety of ways. For example, the receiver component 318 may comprise a photoreceiver, optical receiver, optical sensor, detector, photodetector, optical detector, optical fibers, and the like. As mentioned above, in some embodiments, the receiver component 318 acquires or detects at least a portion of the input beam 324 and produces an electrical signal that corresponds to the input beam 324. For example, if the input beam 324 includes an optical pulse, the receiver component 318 may produce an electrical current or voltage pulse that corresponds to the optical pulse detected by the receiver component 318.

It is contemplated that the receiver component 318 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiver component 318 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, the receiver component 318 may include electronic components configured to convert a received photocurrent (e.g., a current produced by an APD in response to a received optical signal) into a voltage signal. The receiver component 318 may also include additional circuitry for producing an analog or digital output signal that corresponds to one or more characteristics (e.g., rising edge, falling edge, amplitude, duration, and the like) of a received optical pulse.

Controller Component

Depending on the implementation, the controller component 320 may include one or more processors, an application-specific integrated circuit (ASIC), a field-programmable gate array (FPGA), and/or other suitable circuitry. The controller component 320 may also include non-transitory computer-readable memory to store instructions executable by the controller component 320 as well as data which the controller component 320 may produce based on the signals acquired from other internal components of the LiDAR system 310 and/or may provide signals to the other internal components of the LiDAR system 310. The memory can include volatile (e.g., RAM) and/or non-volatile (e.g., flash memory, a hard disk) components. The controller component 320 may be configured to generate data during operation and store it in the memory. For example, this data generated by the controller component 320 may be indicative of the data points in the point cloud of the LiDAR system 310.

It is contemplated that in at least some non-limiting embodiments of the present technology, the controller component 320 may be implemented in a similar manner to the electronic device 210 and/or the computer system 100, without departing from the scope of the present technology.

In addition to collecting data from the receiver component 318, the controller component 320 may also be configured to provide control signals to, and potentially receive diagnostics data from, the light source component 312 and the scanner component 316.

As previously stated, the controller component 320 is communicatively coupled to one or more of the light source component 312, the scanner component 316, and the receiver component 318. The controller component 320 may receive electrical trigger pulses from the light source component 312, where each electrical trigger pulse corresponds to the emission of an optical pulse by the light source component 312. The controller component 320 may further provide instructions, a control signal, and/or a trigger signal to the light source component 312 indicating when the light source component 312 is to produce optical pulses.

Just as an example, the controller component 320 may be configured to send an electrical trigger signal that includes electrical pulses, so that the light source component 312 emits an optical pulse in response to each electrical pulse of the electrical trigger signal. It is also contemplated that, the controller component 320 may cause the light source component 312 to adjust one or more characteristics of light produced by the light source component 312 such as, but not limited to: frequency, period, duration, pulse energy, peak power, average power, and wavelength of the optical pulses.

It should be noted that the controller component 320 may be configured to determine a "time-of-flight" value for an optical pulse based on timing information associated with (i) when a given pulse was emitted by light source component 312 and (ii) when a portion of the pulse (e.g., from the input beam 324) was detected or received by the receiver component 318.

It is contemplated that the controller component 320 may be configured to analyze one or more characteristics of the electrical signals from the light source component 312 and/or the receiver component 318 to determine one or more characteristics of the object 330 such as the distance 390 downrange from the LiDAR system 310.

For example, the controller component 320 may determine the time of flight value and/or a phase modulation value for the emitted pulse of the output beam 322. Let it be assumed that the LiDAR system 310 determines a time-of-light value "T" representing, in a sense, a "round-trip" time for an emitted pulse to travel from the LiDAR system 310 to the object 330 and back to the LiDAR system 310. As a result, the controller component 320 may be configured to determine the distance 390 in accordance with the following equation:

$$D = \frac{c*T}{2} \quad \text{(Equation 1)}$$

wherein D is the distance 390, T is the time-of-flight value, and c is the speed of light (approximately $3.0 \times 10^8$ m/s).

As previously alluded to, the LiDAR system 310 may be used to determine the distance to one or more other potential objects located in the surroundings 250. By scanning the output beam 322 across the ROI 380 of the LiDAR system 310 in accordance with a scanning pattern, the LiDAR system 310 is configured to map distances (similar to the distance 390) to respective data points within the ROI 380 of the LiDAR system 310. As a result, the LiDAR system 310 may be configured to render these data points captured in succession (e.g., the point cloud) in a form of a multi-dimensional map.

As an example, this multi-dimensional map may be used by the electronic device 210 for detecting, or otherwise identifying, objects or determining a shape or distance of potential objects within the ROI 380 of the LiDAR system 310. It is contemplated that the LiDAR system 310 may be configured to repeatedly/iteratively capture and/or generate point clouds at any suitable rate for a given application.

It should be noted that a location of a given object in the surroundings 250 of the vehicle 220 may be overlapped, encompassed, or enclosed at least partially within the ROI of the LiDAR system 310. For example, the object 330 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Specific System Components

Figure 4:
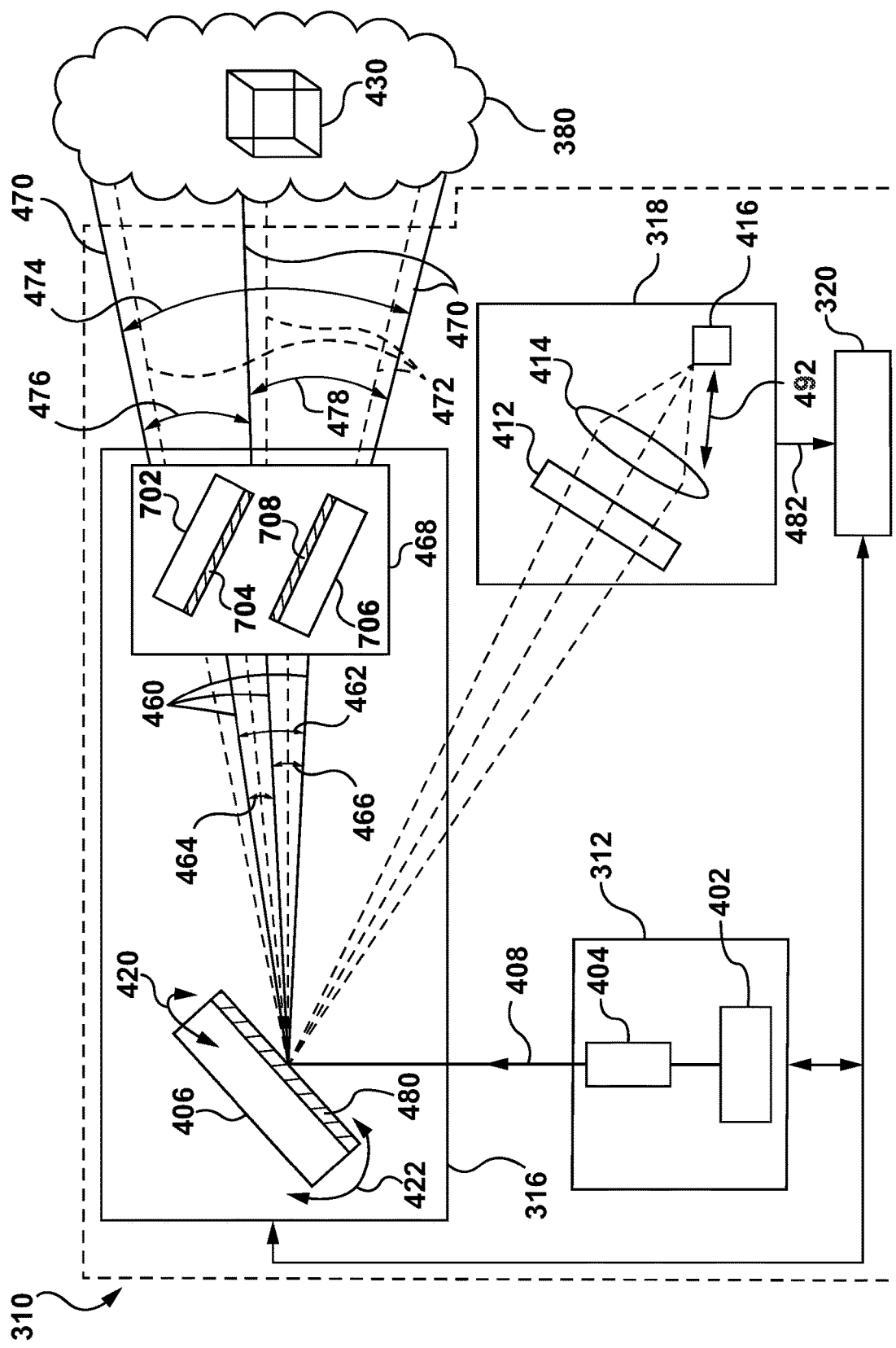
FIG. 4 depicts an implementation of the LiDAR system implemented in accordance to a specific non-limiting embodiment of the present technology.

With reference to FIG. 4, there is depicted an implementation of the LiDAR system 310 executed in accordance to a specific non-limiting embodiment of the present technology.

More specifically, the light source component 312 comprises a laser 402 and a collimator 404, the scanner component 316 comprises an oscillating component 406 and a beam spreading module 468, and the receiver component 318 comprises an optical filter 412 (also referred to herein as a filter component), a receiving lens 414 and an optical detector 416. It is to be noted that other elements may be present but not illustrated for purposes of clarity.

The laser 402 is configured to generate the output beam 322. In one embodiment, the generated output beam 322 comprises a plurality of sequential output beams 408. In other embodiments, the generated output beam comprises a single output beam 408. Further, each output beam 408 may be collimated and/or modulated by the collimator 404. As previously discussed, the LiDAR system 310 may make use of a given internal beam path from a plurality of internal beam paths 314 for emitting the output beam 408 towards the ROI 380.

In one example, the given internal beam path amongst the plurality of internal beam paths 314 may allow providing the collimated and/or modulated output beam 408 from the collimator 404 towards the oscillating component 406 associated with the scanner component 316. As such, the output beam 408 may be directed directly towards the oscillating component 406 without getting divided. Further, the oscillating component 406 has at least one oscillating component reflective surface 480 which is configured to receive and reflect the collimated and/or modulated output beam 408 towards the ROI 380. The average diameter of the oscillating component reflective surface 480 may be between about 0.1 mm to about 10 mm.

It is contemplated that in certain embodiments, the LiDAR system 310 may be configured to rotate horizontally to scan the ROI 380, while the oscillating component 406 is configured to tilt, swing and/or oscillate in multiple directions or angles to allow the laser 402 to emit the output beams 408 in multiple angles to obtain multiple angular resolutions of the one or more objects 430. In other embodiments, the oscillating component 406 may be positioned on a platform (not shown) such that the platform may be configured to rotate on a horizontal plane. As an example, such platform may be located inside the LiDAR system 310 or may be a part of the common housing 340. In other embodiments, one or more of the scanner component 316 or the oscillating component is arranged to rotate horizontally.

In one embodiment, the oscillating component 406 may be implemented using microelectromechanical (MEMS) component. The MEMS component may be configured to oscillate in accordance with an input from the controller component 320. In another embodiment, the oscillating component 406 may be implemented using a galvo-scanner component. The galvo-scanner component may be implemented using any suitable techniques known to a person skilled in the art and may oscillate in accordance with an input from the controller component 320. Without limiting the scope of present technology based on how the oscillating component 406 is being implemented, the oscillating component 406 may be configured to modulate and redirects the output beams 408 towards the beam spreading module 468.

In certain embodiments, the oscillating component 406 is configured to move, such as by one or more of tilting, swinging and/or oscillating in one or more directions or angles (e.g., vertically, horizontally, diagonally, or a combination thereof), as indicated by the directions 420 and 422. In so doing, the oscillating component 406 may modulate the output beams 408 and redirects them in multiple angles (e.g., vertical and/or horizontal angles) as first spread beam 460 along a first spread axis (for example, horizontal axis, vertical axis or a combination thereof). It is to be noted that although the first spread beam 460 have been illustrated in one-dimensional vertical plane, the movement of the oscillating component 406 may also spread the output beams 408 in one-dimensional horizontal plane or in both vertical and horizontal planes resulting in a two-dimensional ROI 380.

Also, an angle of spread associated with the first spread beam 460 may be represented as a first spread beam interval 462 along a first spread axis (for example, horizontal axis, vertical axis or a combination thereof). It will be appreciated that the first spread beam interval 462 may be a plane angle or a solid angle depending upon the spread in one dimension or in two dimensions. As an example, the range of angle, whether a plane angle or a solid angle may be between about 15 degrees to about 60 degrees.

In certain embodiments, the first spread beam interval 462 comprises a first portion 484 (discussed below) having an associated first portion first spread beam interval 464, and a second portion 486 (discussed below) having an associated second portion first spread beam interval 466. In certain embodiments, the first portion 484 (discussed below) associated with the first beam spread 460 is about 50% of the first spread beam 460. In other words, the first portion first spread beam interval 464 is about 50% of the first spread beam interval 462. Similarly, the second portion 486 (discussed below) associated with the first beam spread 460 is about 50% of the first spread beam 460. In other words, the second portion first spread beam interval 466 is about 50% of the first spread beam interval 462.

The beam spreading module 468 may be configured to increase scanning interval associated with the ROI 380. To this end, the first spread beam 460 may be passed through the beam spreading module 468 to increase the first spread beam interval 462. In certain embodiments, the beam spreading module 468 may comprises at least two static optical components having respective optical components reflective surfaces such as a first static optical component 702 having a first optical component reflective surface 704 and a second static optical component 706 having a second optical component reflective surface 708. In certain embodiments, the first static optical component 702 and the second static optical component 706 may have a spatial offset. The oscillating component 406 and the at least two optical components may be positioned relative to each other such that substantially all of the first spread beam 460 may be incident on the respective optical component reflective surfaces of the at least two optical components. The beam spreading module 468 may be configured to increase the first spread beam interval 462. Details of structural arrangements associated with the beam spreading module 468 and its components will be discussed later.

In certain embodiments, the oscillating component 406 may provide the first spread beam 460 to the at least two static optical components. As such, each one of the respective optical component reflective surfaces associated with the at least two static optical components may receive and reflect a respective portion of the first spread beam 460. In certain embodiments, the reflected respective portions of the first spread beam 460 together comprise a second spread beam 470 having a second spread beam interval 474 along a second spread axis (for example, horizontal axis, vertical axis or a combination thereof). The second spread beam interval 474 may be larger than the first spread beam interval 462. In certain embodiments, the second spread beam interval 474 may be up to 100% more than the first spread beam interval.

In certain embodiments, the orientation of the first spread axis and second spread axis may have different combinations depending upon the arrangement of the at least two static optical components. Such combinations include the first spread axis may be horizontal and the corresponding second axis may be horizontal, the first spread axis may be horizontal and the corresponding second axis may be vertical, the first spread axis may be vertical and the corresponding second axis may be horizontal, and the first spread axis may be vertical and the corresponding second axis may be vertical.

By way of example, the first optical component reflective surface 704 associated with the first static optical component 702 may receive the first portion 484 (discussed below) of the first spread beam 460. The first portion 484 (discussed below) of the first spread beam 460 may have the first portion first spread beam interval 464. The first static optical component 702 may reflect the first portion 484 (discussed below) of the first spread beam 460 as a first portion 488 (discussed below) of the second spread beam 470. The first portion 488 (discussed below) of the second spread beam 470 may have a first portion second spread interval 476.

In a similar manner, the second optical component reflective surface 708 associated with the second static optical component 706 may receive the second portion 486 (discussed below) of the first spread beam 460. The second portion 486 (discussed below) of the first spread beam 460 may have the second portion first spread beam interval 466. The second static optical component 706 may reflect the second portion 486 (discussed below) of the first spread beam 460 as a second portion 490 (discussed below) of the second spread beam 470. The second portion 490 (discussed below) of the second spread beam 470 may have a second portion second spread interval 478. It is to be noted that the first and the second portions of the second spread beam 470 comprising the spread beam having the second spread beam interval 474. However, in certain embodiments, the first portion 488 (discussed below) of the second spread beam 470 may have an optical axis (not shown) which is different than an optical axis (not shown) of the second portion 490 (discussed below) of the second spread beam 470.

In certain embodiments, the respective optical components reflective surfaces associated with the at least two static optical components may be angularly offset from one another by an offset angle α on one or two planes. In one embodiment, the offset angle α is one plane and may be less than 180°. It is contemplated that in one embodiment, the at least two optical components may be based on passive mirrors, while in another embodiment, the at least two optical components may be based on prisms.

Figure 5:
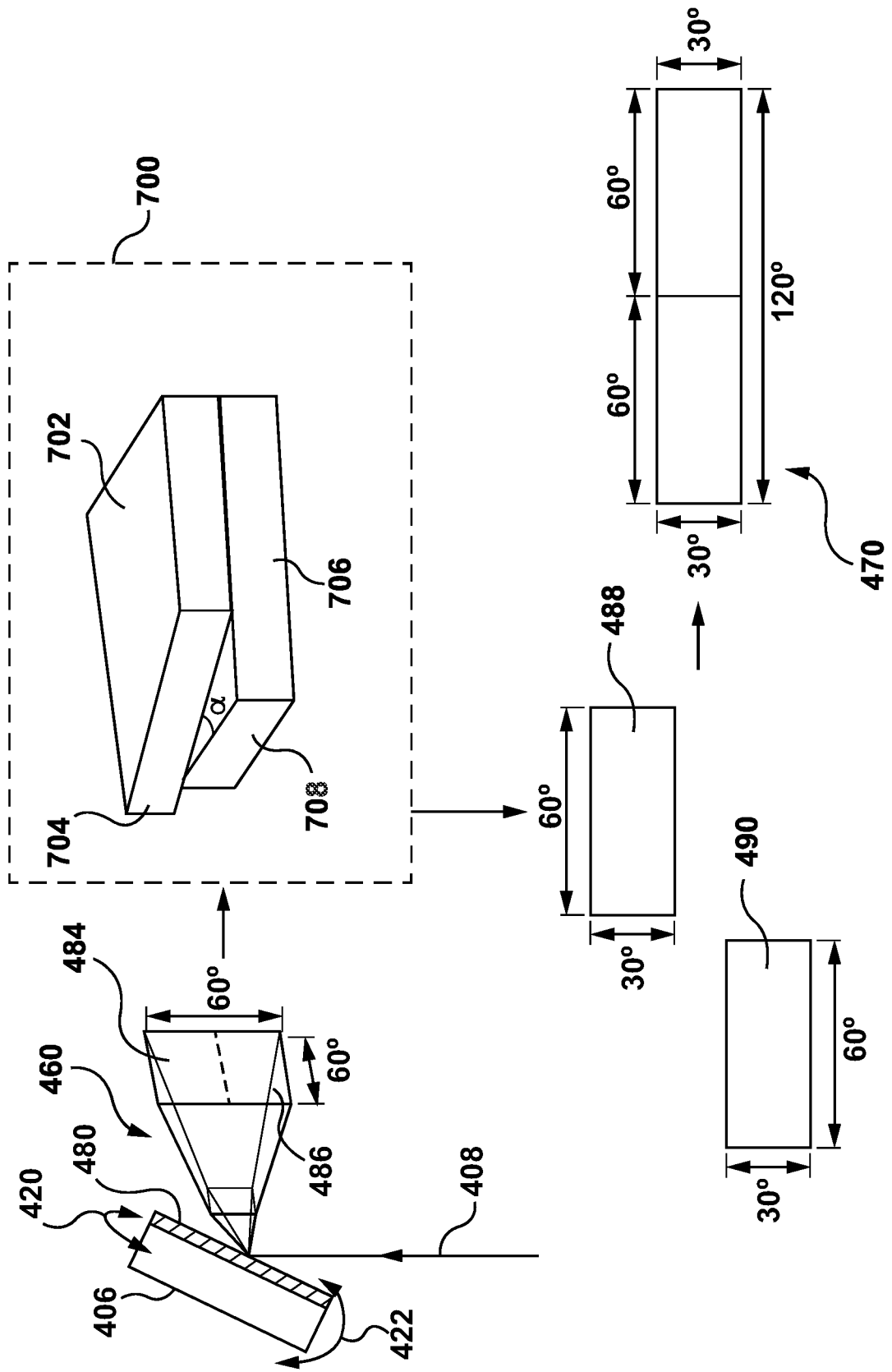
FIG. 5 depicts a representative schematic diagram of a scanner component executed in accordance to a specific non-limiting embodiment of the present technology.

FIG. 5 depicts a representative schematic diagram of the scanner component 316 executed in accordance to a specific non-limiting embodiment of the present technology. As shown, the beam spreading module 468 may be implemented as a prism 700 along with other components (not shown). The prism 700 comprises the first static optical component 702 having the first optical component reflective surface 704 and the second static optical component 706 having the second optical component reflective surface 708.

It is to be noted that the first static optical component 702 and the second static optical component 706 may be angularly offset from one another by an offset angle α.

Further, the oscillating component 406 oscillates in the directions shown by 420 and 422 to modulate the output beam 408 to the first spread beam 460 having the first portion 484 and the second portion 486. In one embodiment, the first spread beam 460 may be a two-dimensional pattern with an initial spread of 60°×60°. In certain embodiments, the oscillating component 406 may provide the first spread beam 460 to the prism 700. In particular, the first optical component reflective surface 704 and the second optical component reflective surface 708 associated with the prism 700 may be configured to receive the first portion 784 and the second portion 486 associated with the first spread beam 460 respectively.

The prism 700 may be configured to split the initial spread of 60°×60° associated with the first spread beam 460 into the first portion 488 and the second portion 490 associated with the second spread beam 470. As such each of the first portion 488 and the second portion 490 may be discontinuous and have a two-dimensional spread of 60°×30°. Using a given internal beam path from the plurality of internal beam paths 314, the first portion 488 and the second portion 490 may be emitted towards the ROI 380 the second spread beam 470 having a continuous two-dimensional spread of 120°×30°. In one embodiment, in order to make the first portion 488 and the second portion 490, the given internal beam path from the plurality of internal beam paths 314 may includes further static optical components such as, a pair of reflecting mirrors or the like. In this manner, the scanner component 316 may increase the first spread beam interval 462 about the first spread axis to the second spread beam interval 474 about the second spread axis.

In certain embodiments, the LiDAR system 310 may emit the second spread beam 470 directly towards the ROI 380. Thus, due to the movement of the oscillating component 406, the emitted second spread beam 470 may be utilized to derive multiple angular resolutions of an object. As a result, in certain embodiments, a only one LiDAR system 310 may scan and capture multiple angular resolutions of an object. The number of LiDAR systems (or number of light sources and light detectors) required to scan an object can be reduced and the cost for operating the vehicle 220 can also be reduced. Moreover, with the use of the beam spreading module 468, LiDAR system 310 may scan a larger ROI 380 with in a hardware requirement of the LiDAR system 310.

It is contemplated that at least a portion of the second spread beam 470 may be reflected by one or more objects 430 in the ROI 380. Such reflected portion of the second spread beam 470 is represented by input beams 472 which may return back towards the LiDAR system 310 and be captured by the LiDAR system 310 via the receiver component 318.

In certain embodiments, the LiDAR system 310 may make use of another given internal beam path from the plurality of internal beam paths 314 as a return pathway for providing the input beams 472 to the receiver component 318. In one example, the return pathway amongst the plurality of internal beam paths 314 may allow providing the input beams 472 from the scanner component 316 to the receiver component 318. In particular, the return pathway may comprise a path from the ROI 380 to the at least two static optical components associated with the beam spreading module 468 and the oscillating component 406 to the receiver component 318.

In at least some embodiments, the return pathway associated with the input beams 472 reflected from the ROI 380 to the receiver component 318 may include a sub-portion that is a same path as one used by the first spread beam 460. As such, the return pathway may include the input beams 472 being incident on, and being reflected by, the first static optical component 702 and the second static optical component 706 towards the oscillating component 406 and from the oscillating component 406 towards the receiver component 318. In other words, the first spread beam 460 and the input beams 472 may at least partially overlap or share a common propagation axis, so that the input beams 472 and the second spread beam 470 travel along substantially the same optical path (albeit in opposite directions).

In another example, the return pathway amongst the plurality of internal beam paths 314 may allow providing the input beams 472 directly from the ROI 380 to the receiver component 318 (without the input beams 472 passing through the scanner component 316). Nevertheless, it is contemplated that the first spread beam 460 and the input beams 472 may include a sub-portion that is a different path as one used by the first spread beam 460, or in other words, the input beams 472 and the first spread beam 460 may not overlap or share a common propagation axis inside the LiDAR system 310, without departing from the scope of the present technology.

The filter component 412 employed in the receiver component 318 may be configured to receive the input beams 472 and filter out the background noise (if any) in the input beams 472 from being detected by the optical detector 416. In one non-limiting embodiment, the filter component 412 may incorporate a single bandpass filter mirror. However, in another non-limiting embodiment, the filter component 412 may incorporate a plurality of bandpass filter mirrors having associated filter pass bands centered about the operating frequency of the second spread beam 470. The second spread beam 470 may exhibit high out-of-band rejection, as well as low in-band attenuation. Further, the bandwidth associated with the filter component 412 may be sufficiently narrow so as to substantially filter or remove components of the solar radiation or stray light in the input beams 472, yet sufficiently broad so as to be substantially larger than the bandwidth of the thermally-broadened spectrum in combination with the largest expected associated Doppler shift. For example, in certain embodiments, filter component 412 may be configured so as to provide for maximum filtering of light frequencies that are outside the frequency band of interest, e.g. greater than about 2 nanometers (nm) above or below a nominal center frequency of the second spread beam 470.

The filtered input beams 472 may then be directed to the receiving lens 414. The receiving lens 414 may be configured to focus the filtered input beams 472 to the optical detector 416. It is to be noted that in certain embodiments, the LiDAR system 310 using a suitable internal beam path from the plurality of internal beam paths 314 may directly provide the input beams 472 to the receiving lens 414 without passing them through the filter component 412. In some other embodiments, the LiDAR system 310 using a suitable internal beam path from the plurality of internal beam paths 314 may directly provide the input beams 472 to the optical detector 416 without passing them through the filter component 412.

Figure 6:
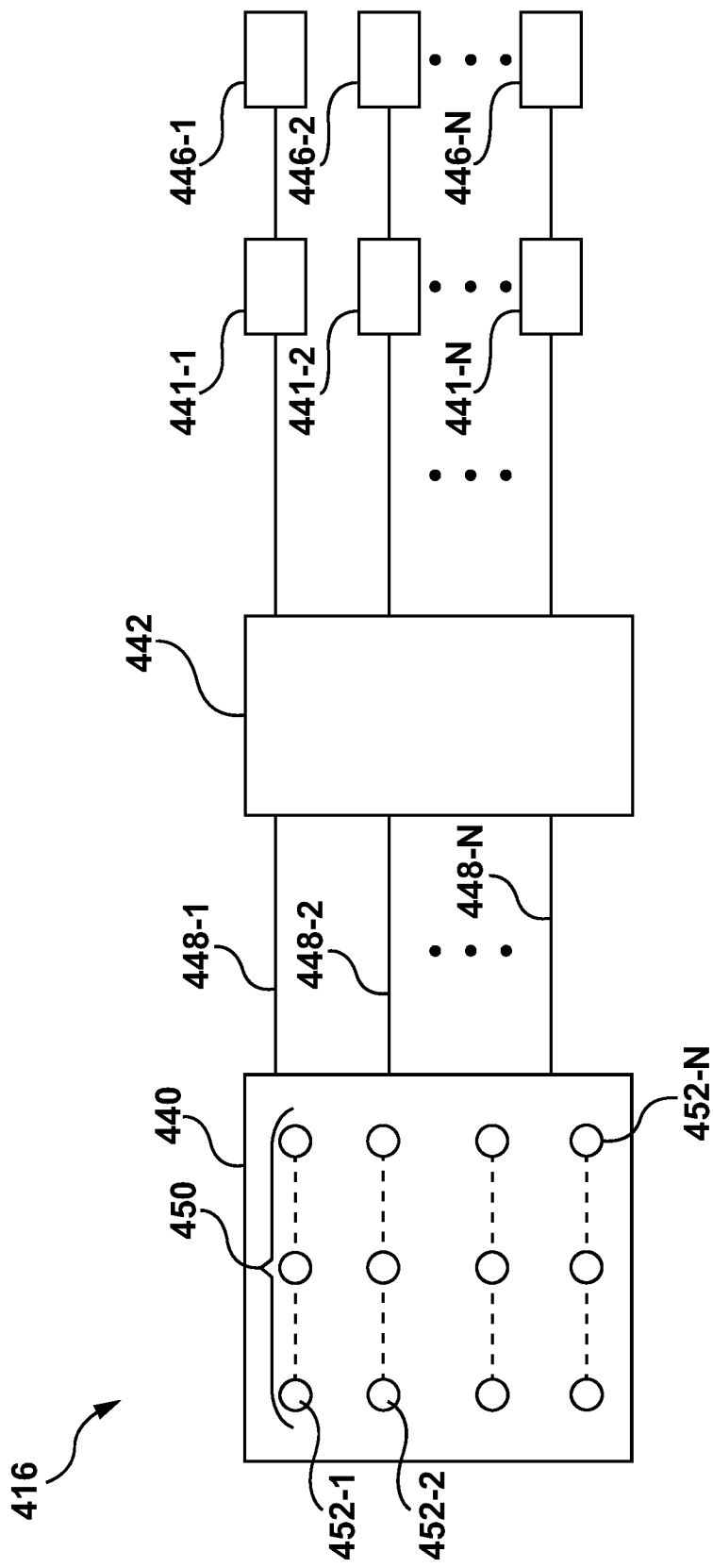
FIG. 6 depicts a representative implementation of an optical detector implemented in accordance to a specific non-limiting embodiment of the present technology.

FIG. 6 depicts a representative implementation of an optical detector 416 executed in accordance to a specific non-limiting embodiment of the present technology. As depicted, in certain embodiments, the optical detector 416 employs an fiber optic array 440 and a plurality of detectors 446-1, 446-2, ... 446-N. The fiber optic array 440 comprises a plurality of optical fibers 450. The plurality of optical fibers 450 associated with the fiber optic array 440 may be connected to the plurality of detectors 446-1, 446-2, ... 446-N to form N optical paths 448-1, 448-2, ... 448-N from the fiber optic array 440 to the plurality of detectors 446-1, 446-2, ... 446-N.

In certain embodiments, the plurality of detectors 446-1, 446-2, ... 446-N correspond, one-to-one, to the plurality of optical fibers 450 associated with the fiber optic array 440, and each detector in the plurality of detectors 446-1, 446-2, ... 446-N may be configured to receive the input beams 472 through the fiber optic array 440. In other words, a given optical fiber 450 of the fiber optic array 440 is associated with a given detector of the plurality of detectors 446-1, 446-2, ... 446-N, in a one-to-one relationship. In these embodiments, a given optical fiber and a given detector are connected by a given optical path.

In the above one-to-one arrangement of the plurality of detectors 446-1, 446-2, ... 446-N and the plurality of optical fibers 450, an increased density of data points in the given ROI 380 may be achieved, and hence an increased resolution of the object in the ROI 380, as will be described below. By increased density of data points in the given ROI 380 is meant an increased number of output beams incident in the ROI 380 in a given time, and subsequently an increased number of data points defined in the ROI 380 in the given time.

In embodiments with the one-to-one arrangement, the controller component 320 may be configured to monitor which of the optical fibers of the plurality of optical fibers 450 and its associated detector is receiving which input beam, such as input beams 472. With this monitoring process, the light source component 312 may be configured to emit the output beam 408 without waiting for the detection of the input beams 472 resulting in the increased density of the data points.

It is contemplated that in certain other embodiments, instead of a one-to-one relationship between optical fibres of the fiber optic array 440 and the plurality of detectors 446-1, 446-2, ... 446-N, a subset of the plurality of optical fibers 450 associated with the fiber optic array 440 may have a common detector from the plurality of detectors 446-1, 446-2, ... 446-N. In these embodiments, a plurality of optical paths would be associated with a single detector. In such embodiments, reducing the number of detectors may also result in a cost saving. Also, in certain embodiments the common detector from the plurality of detectors 446-1, 446-2, ... 446-N may require less power and space thereby, saving some physical space power requirement while implementing the LiDAR system 310.

In certain embodiments, the optical detector 416 may also include an optical fiber connector 442 and a plurality of micro-lens 441-1, 441-2, . . . 441-N. The optical fiber connector 442 may be configured to connect the plurality of optical fibers 450 associated with the fiber optic array 440 to the plurality of detectors 446-1, 446-2, ... 446-N to form the N optical paths 448-1, 448-2, ... 448-N from the fiber optic array 440 to the plurality of detectors 446-1, 446-2, ... 446-N. The plurality of micro-lens 441-1, 441-2 ... 441-N may correspond, one-to-one, to the plurality of detectors 446-1, 446-2, ... 446-N, and may be configured to converge the input beams 472 transmitted via the plurality of optical fibers 450 associated with the fiber optic array 440 to the corresponding plurality of detectors 446-1, 446-2, ... 446-N.

Turning now to the optical fibers, it is contemplated that in certain embodiments, the plurality of optical fibers 450 may be constructed as the fiber optic array 440 in any manner, such as by laser welding, butt welding, soldering, or the like. Further, at least some of the optical fibers in the plurality of optical fibers 450 may have a polarization-maintaining axis which is oriented or aligned based on positioning of the plurality of optical fibers. As an example, the polarization-maintaining axis of the plurality of optical fibers 450 are all aligned to be substantially parallel to a single plane. As such, the polarization-maintaining axis may assist the plurality of optical fibers 450 to control and maintain certain polarizations for example linear polarization.

In certain embodiments, at least some of the optical fibers of the plurality of optical fibers 450 may have a circular cross-section. In certain other embodiments, at least some of the optical fibers of the plurality of optical fibers 450 may have a cross-section which is not circular, such as a polygonal (e.g., octagon, hexagon or other suitable polygon) shape, or a curved circumference having at least one flat (e.g., a flatted side on a circular cross section), or any other shape. The optical fibers of the plurality of optical fibers 450 may have any suitable refractive index.

In certain embodiments, at least some of the optical fibers of the plurality of optical fibers 450 may further include a filter, such as a fiber Bragg grating (FBG) filters (not depicted) to filter certain wavelengths of light. In certain embodiments, FBG filters reflect certain wavelengths of light and transmit other wavelengths.

It is contemplated that the individual optical fibers in the fiber optic array 440 may be arranged in any manner such as in aligned rows, staggered rows, circular or spiral configuration, or the like. It will be appreciated that the physical characteristics of the plurality of optical fibers 450 or how the plurality of optical fibers are arranged in the fiber optic array 440 should not limit the scope of present technology by any means.

The plurality of optical fibers 450 associated with the fiber optic array 440 has receiving ends 452-1, 452-2, ... 452-N which are arranged to receive at least one of the input beams 472. The receiving ends 452-1, 452-2, ... 452-N of the plurality of optical fibers 450 are arranged as a two dimensional fiber optic array 440. The receiving ends of the plurality of optical fibers 450 may be equally or unequally spaced from one another. The fiber optic array 440 may have an equal or unequal number of receiving ends along an x-axis or a y-axis.

In certain embodiments, the receiving lens 414 may be configured to focus at least one of the input beams 472 to one of the receiving ends 452-1, 452-2, ... 452-N. In certain embodiments, a distance 492 between the receiving lens 414 and one of the receiving ends 452-1, 452-2, ... 452-N comprises a focal distance of at least one of the input beams 472. The end face of the fiber optic array 440 may be on a focal plane of the receiving lens 414. Further, for a given detection time interval, the receiving lens 414 may be configured to focus different input beams to different receiving ends of the receiving ends 452-1, 452-2, ... 452-N of the plurality of optical fibers 450. In this respect, in certain embodiments the receiving lens 414 may be configured to move or tilt in a suitable manner such that at least one the input beams 472 may be focused on at least one of plurality of optical fibers 450. It is to be noted that the movement of the receiving lens 414 may be controlled by the controller component 320.

As previously discussed, in certain embodiments, the plurality of detectors 446-1, 446-2, . . . 446-N may be configured to detect at least a portion of the input beams 472 and produce electrical signals 482 that corresponds to the input beams 472. For example, if the input beams 472 includes an optical pulse, the plurality of detectors 446-1, 446-2, . . . 446-N may produce electrical signals 482 such as electrical current or voltage pulses that corresponds to the optical pulses detected by the plurality of detectors 446-1, 446-2, . . . 446-N.

It is contemplated that the plurality of detectors 446-1, 446-2, . . . 446-N may be implemented as photodetectors with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In certain embodiments, the plurality of detectors 446-1, 446-2, . . . 446-N may be communicatively coupled to the controller component 320. The controller component 320 may be configured to receive the electrical signals 482 from the plurality of detectors 446-1, 446-2, . . . 446-N. The controller component 320 may further be configured to analyse the electrical signals 482 to detect one or more objects 430 in the ROI 380. It is contemplated that the controller component 320 may use any suitable techniques (such as, techniques based on determining "Time-of-Flight" as previously discussed) for detecting objects without departing from the principles presented herein.

The controller component 320 may further be communicatively coupled to the scanner component 316, more specifically to the oscillating component 406, to control the movement of the oscillating component 406, and more specifically one or more of the tilting, swinging and/or oscillation amplitudes of the oscillating component 406. In particular, initially the oscillating component 406 may be oscillating at a first oscillation amplitude to spread the first spread beam 460 by the first spread beam interval 462 about the first spread axis. Upon detecting the one or more objects 430 in the ROI 380 based on input beams 472, the controller component 320 may be configured to modulate the first oscillation amplitude of the oscillating component 406 to be modulated to first modulated oscillation amplitude. In so doing, the controller component 320 may reduce the first spread beam interval 462 of the first spread beam 460. In certain embodiments, the first oscillation amplitude is greater than the first modulated oscillation amplitude.

The controller component 320 may further be communicatively coupled to the light source component 312 in such a manner that the controller component 320 may be configured to control the emissions from the light source component 312. In one embodiment, the emission of the next output beams after the emission of the output beam 408 may be coordinated with detection of the input beams 472 by the optical detector 416. As such, the controller component 320 may be configured to cause the light source component 312 to emit the output beams after the emission of the output beam 408 after the input beams 472 has been detected. While in other embodiments, the light source component 312 may be configured to operate independently of the optical detector 416. That is, the light source component 312 may emit next output beam(s) after the emission of the output beam 408 without coordinating with the detection of the input beams 472 by the optical detector 416.

Computer-Implemented Methods

Figure 7:
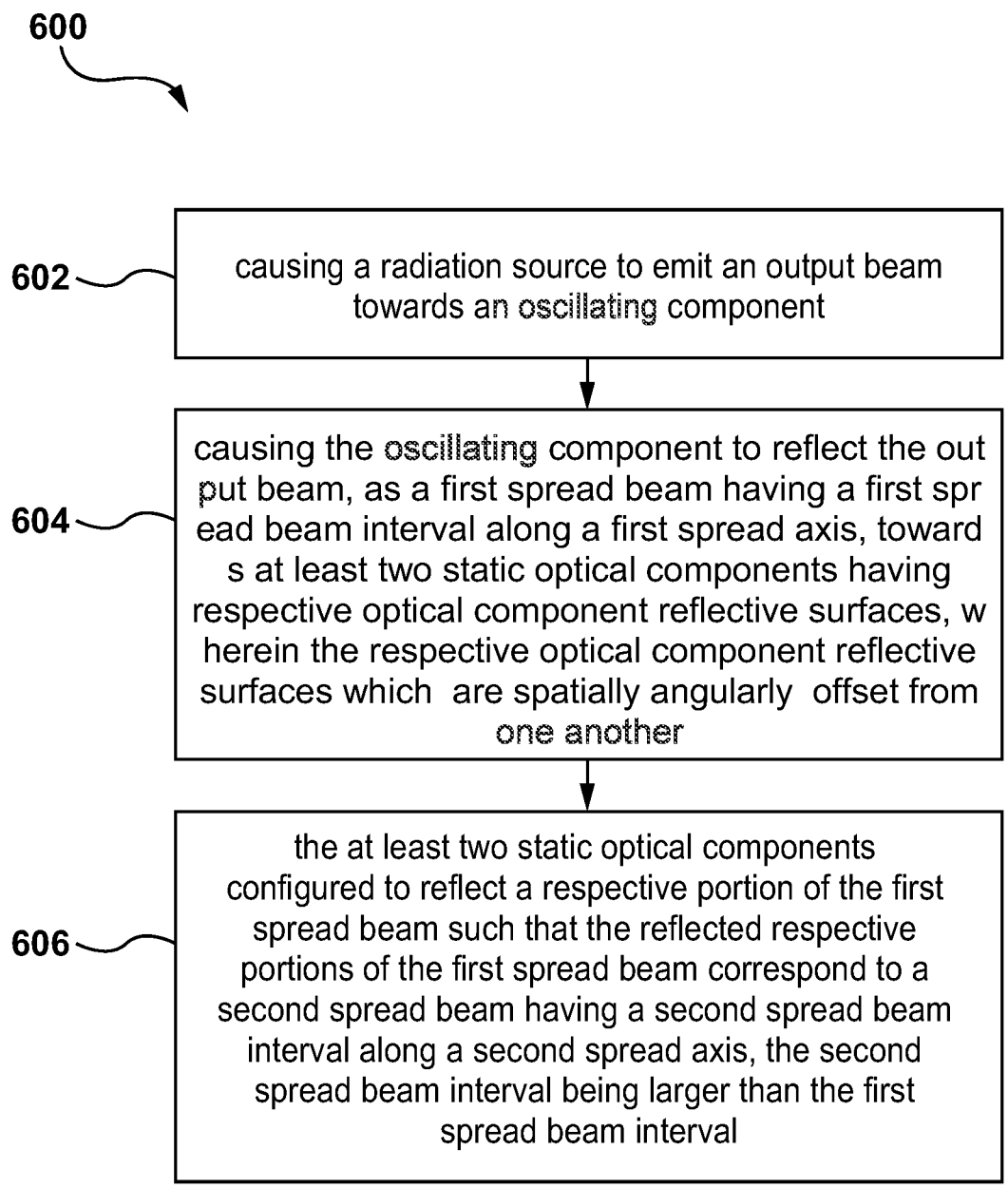
FIG. 7 illustrates a flowchart of a method for detecting objects in a region of interest, in accordance with various non-limiting embodiments of the present technology.

Now turning to FIG. 7, a flowchart of a method 600 for detecting objects in a region of interest is illustrated, in accordance with various non-limiting embodiments of the present technology.

In some non-limiting embodiments of the present technology, the method 600 may be implemented by the controller component 320 communicatively connected to the LiDAR system 310. As previously discussed that in at least some non-limiting embodiments of the present technology, the controller component 320 may include one or more processors and may be implemented in a similar manner to the electronic device 210 and/or the computer system 100, without departing from the scope of the present technology. The method 600 begins at step 602.

Step 602: causing a radiation source to emit an output beam towards a oscillating component.

At step 602, the controller component 320 provides instructions, a control signal, and/or a trigger signal to the light source component 312 indicating when the radiation source component 312 (such as the light source component) is to emit the output beam 408 towards the oscillating component 406. In one or more steps associated with the method 600, the controller component 320 may be configured to cause the light source component 312 to emit the output beam 408 towards the oscillating component 406 in certain conditions. Such conditions may include but are not limited to: upon operating the vehicle 220 in self-driving mode, when the vehicle 220 is in motion irrespective of the driving mode, when the vehicle 220 is stationary, when the vehicle 220 is initially turned on, or based on a manual operation performed by a user (not depicted) operating the vehicle 220 etc.

Step 604: causing the oscillating component to reflect the output beam, as a first spread beam having a first spread beam interval along a first spread axis, towards at least two static optical components having respective optical component reflective surfaces, wherein the respective optical component reflective surfaces are angularly offset from one another.

At step 604, the oscillating component 406 may modulate the output beams 408 and redirects them in multiple angles (e.g., vertical and/or horizontal angles) as first spread beam 460 along the first spread axis (for example, horizontal axis, vertical axis or a combination thereof). As such, the angle of spread associated with the first spread beam 460 is represented as the first spread beam interval 462. The oscillating component 406 provides the first spread beam 460 to at least two static optical components having respective optical components reflective surfaces such as the first static optical component 702 having the first optical component reflective surface 704 and the second static optical component 706 having a second optical component reflective surface 708. The first optical component reflective surface 704 and the second optical component reflective surface 708 are angularly offset from one another by an offset angle α on one or two planes.

In one non-limiting step, the at least two optical components may be based on passive mirrors, while in another non-limiting step, the at least two optical components may be based on prisms.

Step 606: the at least two static optical components configured to reflect a respective portion of the first spread beam such that the reflected respective portions of the first spread beam correspond to a second spread beam having a second spread beam interval along a second spread axis, the second spread beam interval being larger than the first spread beam interval.

Finally at step 606, at least a portion of the output beams 424 and 426 reflected by one or more objects 430 in the ROI 380 represented by input beams 472 returns back towards the LiDAR system 310. The input beams 472 are captured by the LiDAR system 310 via the receiver component 318.

Finally at step 606, the first optical component reflective surface 704 receives the first portion 484 of the first spread beam 460. The first static optical component 702 reflects the first portion 484 of the first spread beam 460 as the first portion 488 of the second spread beam 470. In a similar manner, the second optical component reflective surface 708 receives the second portion 486 of the first spread beam 460. The second static optical component 706 reflects the second portion 486 of the first spread beam 460 as the second portion 490 of the second spread beam 470. It is to be noted that the first and the second portions of the second spread beam 470 comprising the spread beam having the second spread beam interval 474 which is larger than the first spread beam interval 462.

In one or more non-limiting steps associated with the method 600, in order to determine one or more objects 430 in the ROI 380, the controller component 320 may be configured to determine a "time-of-flight" value for a light beam based on timing information associated with (i) when a given light beam (e.g. output beam 408) was emitted by light source component 312 and (ii) when a portion of the light beam (e.g., from the input beams 472) was detected or received by the receiver component 318.

In one or more non-limiting steps associated with the method 600, the controller component 320 may be configured to provide control signals to oscillating component 406 to oscillate at an oscillation amplitude such that the controller component 320 receives sufficient data points in the point cloud of the LiDAR system 310 associated with the one or more objects 430. As a result, the controller component 320 may be configured to render these data points captured in succession (e.g., the point cloud) in a form of the multi-dimensional map of one or more objects 430 in the ROI 380.

In other non-limiting steps associated with the method 600, once the multi-dimensional map of one or more objects 430 has been rendered, the controller component 320 may be configured to provide control signals to oscillating component 406 to oscillate with original oscillations i.e. the first and/or second oscillation amplitude. In so doing, the LiDAR system 310 may again scan the vertical interval 504, horizontal interval 514 or horizontal and vertical interval 524.

In one or more non-limiting steps associated with the method 600, the controller component 320 may control the emission of the next output beam(s) after the emission of the output beam 408 and such emission may be coordinated with detection of the input beams 472 by the optical detector 416. As such, the controller component 320 may be configured to cause the light source component 312 to emit the output beam(s) after the emission of the output beam 408 after the input beams 472 has been detected.

In one or more non-limiting steps associated with the method 600, the light source component 312 may be configured to operate independently of the optical detector 416. That is, the light source component 312 may emit next output beams after the emission of the output beam 408 without coordinating with the detection of the input beams 472 by the optical detector 416.

It should be apparent to those skilled in the art that at least some embodiments of the present technology aim to expand a range of technical solutions for addressing a particular technical problem, namely improving performance of a LiDAR system while reducing the hardware burden imposed on various LiDAR systems by incorporating oscillating components and modulating the amplitude of oscillations associated with the oscillating components for selectively controlling the intervals of the output beams.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A LiDAR system for detecting objects in a region of interest, the system comprising:
    a light source component comprising a radiation source for emitting an output beam;
    an oscillating component having an oscillating component reflective surface for receiving the output beam, the oscillating component being arranged to oscillate to modulate the output beam to a first spread beam having a first spread beam interval along a first spread axis;
    at least two static optical components having respective optical component reflective surfaces for receiving the first spread beam, the respective optical component reflective surfaces of the at least two static optical components being angularly offset from one another such that:
        each one of the respective optical component reflective surfaces receives and reflects a respective portion of the first spread beam;
        the first spread beam being split and reflected, wherein the reflected respective portions of the first spread beam together comprise a second spread beam having a second spread beam interval along a second spread axis, the second spread beam interval being up to 100% larger than the first spread beam interval.

2. The LiDAR system of claim 1, wherein the respective optical component reflective surfaces of the at least two static optical components are angularly offset from one another by an offset angle on one or two planes.

3. The LiDAR system of claim 2, wherein the offset angle is on one plane and is less than 180°.

4. The LiDAR system of claim 1, wherein the oscillating component and the at least two optical components are positioned relative to each other such that substantially all of the first spread beam is incident on the respective optical component reflective surfaces of the at least two optical components.

5. The LiDAR system of claim 1, wherein the at least two static optical components comprise:
    a first static optical component having a first optical component reflective surface for receiving a first portion of the first spread beam and reflecting the first portion of the first spread beam as a first portion of the second spread beam, and
    a second static optical component having a second optical component reflective surface for receiving a second portion of the first spread beam and reflecting the second portion of the first spread beam as a second portion of the second spread beam, the first and the second portions of the second spread beam comprising the spread beam having the second spread beam interval along the second spread axis.

6. The LiDAR system of claim 5, wherein the first portion of the second spread beam has an optical axis which is different than an optical axis of the second portion of the second spread beam.

7. The LiDAR system of claim 5, wherein the first portion of the first spread beam is 50% of the first spread beam.

8. The LiDAR system of claim 1, wherein the output beam comprises a single beam emitted by the radiation source and which is undivided when received on the oscillating component reflective surface of the oscillating component.

9. The LiDAR system of claim 1, wherein the system is arranged such that the second spread beam is a final beam transmitted directly to the region of interest.

10. The LiDAR system of claim 1, wherein the at least two static optical components are passive mirrors.

11. The LiDAR system of claim 1, wherein the at least two static optical components are prisms.

12. The LiDAR system of claim 1, wherein an orientation of the first spread axis and the second spread axis comprise one or more of:
the first spread axis is horizontal and the second spread axis horizontal;
the first spread axis is horizontal and the second spread axis is vertical;
the first spread axis is vertical and the second spread axis horizontal;
the first spread axis is vertical and the second spread axis is vertical.

13. The LiDAR system of claim 1, wherein the first spread beam interval is associated with an amplitude of oscillation of the oscillating component.

14. The LiDAR system of claim 1, further comprising: a detector for detecting an input beam from the region of interest, and a return pathway for the input beam from the region of interest to the detector.

15. The LiDAR system of claim 14, wherein the return pathway comprises a path from the region of interest to the at least two static optical components and the oscillating component to the detector.

16. The LiDAR system of claim 15, wherein the return pathway includes a sub-portion that is a same path as one used for the first spread beam.

17. The LiDAR system of claim 15, wherein the return pathway includes a sub-portion that is a different path as one used for the first spread beam.

18. The LiDAR system of claim 1, wherein the at least two static optical components are spatially offset.

19. The LiDAR system of claim 1, wherein the oscillating component is a microelectromechanical (MEMS) component.

20. The LiDAR system of claim 1, wherein the oscillating component is a galvo-scanner component.

21. A method for detecting objects in a region of interest, the method implemented by a processor communicatively connected to a LiDAR system, the method comprising:
causing a radiation source to emit an output beam towards an oscillating component; and
causing the oscillating component to reflect the output beam, as a first spread beam having a first spread beam interval along a first spread axis, towards at least two static optical components having respective optical component reflective surfaces, wherein the respective optical component reflective surfaces are angularly offset from one another, the at least two static optical components configured to split and reflect a respective portion of the first spread beam such that the reflected respective portions of the first spread beam correspond to a second spread beam having a second spread beam interval along a second spread axis, the second spread beam interval being up to 100% larger than the first spread beam interval.

* * * * *